United States Patent
Kostrzewski et al.

(10) Patent No.: US 12,024,046 B2
(45) Date of Patent: Jul. 2, 2024

(54) SYSTEMS AND METHODS FOR INFLUENCING ELECTRIFIED VEHICLE CHARGING DECISIONS

(71) Applicant: FORD GLOBAL TECHNOLOGIES, LLC, Dearborn, MI (US)

(72) Inventors: Thomas Jeremy Kostrzewski, Brownstown, MI (US); Stephen Thomas Powell, Auburn Hills, MI (US); Ling Gong, Canton, MI (US); Samuel Joseph Johnson, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 346 days.

(21) Appl. No.: 17/494,204

(22) Filed: Oct. 5, 2021

(65) Prior Publication Data

US 2023/0105569 A1    Apr. 6, 2023

(51) Int. Cl.
*B60L 53/64* (2019.01)
*B60L 53/10* (2019.01)
*B60L 53/30* (2019.01)
*B60L 53/62* (2019.01)

(52) U.S. Cl.
CPC .............. *B60L 53/64* (2019.02); *B60L 53/11* (2019.02); *B60L 53/305* (2019.02); *B60L 53/62* (2019.02)

(58) Field of Classification Search
CPC ........ B60L 53/64; B60L 53/11; B60L 53/305; B60L 53/62; B60L 2240/622; B60L 2260/52; B60L 53/68; B60L 58/12; Y02T 10/70; Y02T 10/7072
USPC .......................................................... 320/109
See application file for complete search history.

(56) References Cited

U.S. PATENT DOCUMENTS

| | | | |
|---|---|---|---|
| 8,963,494 B2 | 2/2015 | Kishiyama et al. | |
| 8,965,669 B2 | 2/2015 | Fisher et al. | |
| 2014/0184170 A1* | 7/2014 | Jeong | G06Q 50/06 320/137 |
| 2014/0316939 A1 | 10/2014 | Uyeki | |
| 2018/0143029 A1* | 5/2018 | Nikulin | G01C 21/3415 |
| 2019/0383637 A1 | 12/2019 | Teske | |
| 2020/0294078 A1 | 9/2020 | Hu et al. | |
| 2021/0252991 A1* | 8/2021 | Pizzurro | B60L 53/11 |
| 2022/0050143 A1* | 2/2022 | Maeda | B60L 53/305 |

* cited by examiner

*Primary Examiner* — Paul Dinh
(74) *Attorney, Agent, or Firm* — David B. Kelley; Carlson, Gaskey & Olds, P.C.

(57) ABSTRACT

Charging guidance systems and methods for charging electrified vehicles may be configured to influence a user's charging decisions in a manner that simplifies the vehicle charging experience. Exemplary charging guidance systems may be configured to coach the user to charge a traction battery pack of the vehicle at a lower level charging option as opposed to a higher level charging option. Charging at lower level charging options when certain conditions are met reduces the amount of times the vehicle is charged using more aggressive charging methodologies, thereby improving battery performance, reducing costs, and preserving the life/warranty and asset utilization of the traction battery pack over the entire usage life of electrified vehicles.

20 Claims, 6 Drawing Sheets

SYSTEMS AND METHODS FOR INFLUENCING ELECTRIFIED VEHICLE CHARGING DECISIONS

TECHNICAL FIELD

This disclosure relates generally to electrified vehicles, and more particularly to vehicle charging guidance systems and methods designed to influence the charging decisions of electrified vehicle users.

BACKGROUND

Electrified vehicles are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port that is connectable to electric vehicle supply equipment (EVSE) for charging the traction battery pack from a grid power source.

SUMMARY

An electrified vehicle according to an exemplary aspect of the present disclosure includes, among other things, a traction battery pack and a charging guidance system configured to influence a decision for charging the traction battery pack at a lower level charging option as opposed to a higher level charging option in response to a user input.

In a further non-limiting embodiment of the foregoing electrified vehicle, the lower level charging option includes Level 2 charging and the higher level charging option includes DC fast charging.

In a further non-limiting embodiment of either of the foregoing electrified vehicles, the charging guidance system includes a control module programmed to execute a charging guidance feature of the charging guidance system.

In a further non-limiting embodiment of any of the foregoing electrified vehicles, the charging guidance feature includes a series of charging-related prompts that are presentable to a user of the electrified vehicle and adapted to influence the decision for charging the traction battery pack.

In a further non-limiting embodiment of any of the foregoing electrified vehicles, the charging-related prompts include a time versus range gained table for the lower level charging option.

In a further non-limiting embodiment of any of the foregoing electrified vehicles, the control module is further programmed to command that the time versus range gained table be displayed on a user interface of a human machine interface or a personal electronic device associated with the electrified vehicle.

In a further non-limiting embodiment of any of the foregoing electrified vehicles, the control module is a component of the electrified vehicle.

In a further non-limiting embodiment of any of the foregoing electrified vehicles, the control module is further programmed to generate a list of nearby charging station locations as part of the charging guidance feature.

In a further non-limiting embodiment of any of the foregoing electrified vehicles, the control module is further programmed to calculate whether or not a distance to drive after charging is less than an estimated travel range of the electrified vehicle prior to charging as part of the charging guidance feature.

In a further non-limiting embodiment of any of the foregoing electrified vehicles, the control module is further programmed to determine an amount of range gained over time for the lower level charging option when the distance to drive after charging is greater than the estimated travel range of the electrified vehicle prior to charging and is further programmed to inform the user to charge at the lower level charging option when the distance to drive after charging is less than the estimated travel range of the electrified vehicle prior to charging.

In a further non-limiting embodiment of any of the foregoing electrified vehicles, a human machine interface (HMI) is configured to allow a user to enter the user input.

In a further non-limiting embodiment of any of the foregoing electrified vehicles, the user input is initiated when the user actuates a charge planner icon of the HMI.

A method according to another exemplary aspect of the present disclosure includes, among other things, receiving, at a control module of a charging guidance system of an electrified vehicle, a user input indicating that a charging guidance feature has been initiated, and presenting a user of the electrified vehicle with a series of charging-related prompts in response to receiving the user input. The charging-related prompts are configured to influence a decision for charging a traction battery pack of the electrified vehicle at a lower level charging option as opposed to a higher level charging option.

In a further non-limiting embodiment of the foregoing method, the lower level charging option includes Level 2 charging and the higher level charging option includes DC fast charging.

In a further non-limiting embodiment of either of the foregoing methods, presenting the user with the series of charging-related prompts includes prompting the user to select a nearby charging station.

In a further non-limiting embodiment of any of the foregoing methods, presenting the user with the series of charging-related prompts includes prompting the user to indicate a distance to travel after charging.

In a further non-limiting embodiment of any of the foregoing methods, presenting the user with the series of charging-related prompts includes displaying a time versus range gained table for the lower level charging option.

In a further non-limiting embodiment of any of the foregoing methods, presenting the user with the series of charging-related prompts includes prompting the user to indicate whether the range gained indicated by the time versus range gained table is sufficient to meet the user's travel needs.

In a further non-limiting embodiment of any of the foregoing methods, presenting the user with the series of charging-related prompts includes informing the user to charge via the lower level charging option when the user indicates that the range gained is sufficient to meet the user's travel needs.

In a further non-limiting embodiment of any of the foregoing methods, the user input is received from a user interface associated with a human machine interface (HMI) of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes charging guidance systems and methods for charging electrified vehicles in a manner that simplifies the vehicle charging experience. Exemplary charging guidance systems may be configured to coach the user to charge a traction battery pack of the vehicle at a lower level charging option as opposed to a higher level charging option. Charging at lower level charging options when certain conditions are met reduces the amount of times the vehicle is charged using more aggressive charging methodologies, thereby improving battery performance, reducing costs, and preserving the life/warranty and asset utilization of the traction battery pack over the entire usage life of electrified vehicles. These and other features of this disclosure are discussed in greater detail in the following paragraphs of this detailed description.

Figure 1:
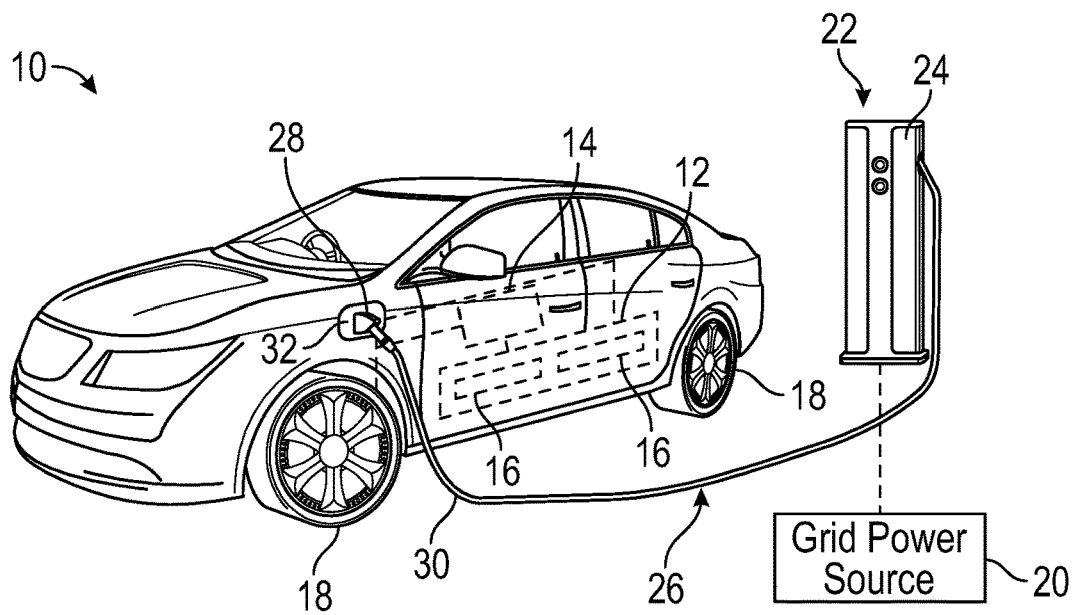
FIG. 1 illustrates an electrified vehicle operably connected to an electric vehicle supply equipment (EVSE) system.

FIG. 1 illustrates an exemplary electrified vehicle 10 that includes a traction battery pack 12. The electrified vehicle 10 may include any electrified powertrain capable of applying a torque from an electric machine 14 for driving drive wheels 18 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain of the electrified vehicle 10 may electrically propel the drive wheels 18 either with or without the assistance of an internal combustion engine.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (e.g., battery assemblies or groupings of battery cells) capable of outputting electrical power to the one or more electric machines 14 (e.g., electric motors) of the electrified vehicle 10. Other types of energy storage devices and/or output devices can also be used to electrically power the electrified vehicle 10.

The traction battery pack 12 may periodically require charging for replenishing its energy levels. The electrified vehicle 10 may therefore interface with a grid power source 20 (e.g., AC power, solar power, wind power, or combinations thereof) through an electric vehicle supply equipment (EVSE) system 22 in order to transfer energy from the grid power source 20 to the electrified vehicle 10 for charging the traction battery pack 12.

The EVSE system 22 may include an EVSE housing 24 and a charging cord assembly 26. The EVSE housing 24 may be configured as a wall box, a charging station stanchion, etc. The specific configuration of the EVSE housing 24 is not intended to limit this disclosure. The EVSE housing 24 may include the necessary equipment (e.g., relays, human machine interfaces, etc.) for coordinating the transfer of energy between the electrified vehicle 10 and the grid power source 20.

The charging cord assembly 26 may include one or more charge couplers 28 and a cable 30. The cable 30 may be connected at one end to the charge coupler 28 and at an opposite end to the EVSE housing 24 or another charge coupler. The charge coupler 28 may be coupled (e.g., plugged-in) to a charge port assembly 32 (sometimes referred to as a vehicle inlet assembly) of the electrified vehicle 10 in order to transfer energy from the grid power source 20 to the electrified vehicle 10.

In an embodiment, the charge coupler 28 is configured to plug into an SAE J1772 type charge port assembly 32. However, other charge coupler/charge port configurations are further contemplated within the scope of this disclosure. The specific configurations of the charge coupler 28 and the charge port assembly 32 are therefore not intended to limit this disclosure.

The EVSE system 22 and the electrified vehicle 10 may be configured to provide any level of charging (e.g., Level 1 AC charging, Level 2 AC charging, DC fast charging, etc.) within the scope of this disclosure. In general, Level 1 charging refers to charging events in which power levels of less than about 2.4 kW are delivered for charging the battery cells of the traction battery pack 12, and Level 2 charging refers to charging events in which power levels of between about 3 kW and about 20 kW are delivered for charging the battery cells of the traction battery pack 12. Both Level 1 and Level 2 charging are typically delivered using an onboard power conversion module that is adapted to convert AC inputs to DC outputs. DC fast charging refers to charging events in which power levels of about 50 kW or more are delivered for rapidly charging the battery cells of the traction battery pack 12. In this disclosure, the term "about" means that the expressed quantities or ranges need not be exact but may be approximated and/or larger or smaller, reflecting acceptable tolerances, conversion factors, measurement error, etc.

DC fast charging is considered to be a more aggressive type of charging compared to Level 1 and Level 2 charging. Although faster and in many cases more convenient, repeated DC fast charging events can result in degradation of the performance of the traction battery pack 12. It may therefore be desirable to reduce the number of times the electrified vehicle 10 is charged via DC fast charging. Given the relative market immaturity of plug-in type electrified vehicles, some customers may not fully understand the potential drawbacks of repeated DC fast charging. This disclosure is therefore directed to vehicle systems and methods for influencing a user's charging decisions, such as by "coaching" the user to select less aggressive charging options when certain user and vehicle conditions are met, in order to improve battery performance, reduce costs, and to preserve the life/warranty and asset utilization of the traction battery pack 12 over the entire usage life of the electrified vehicle 10.

Figure 2:
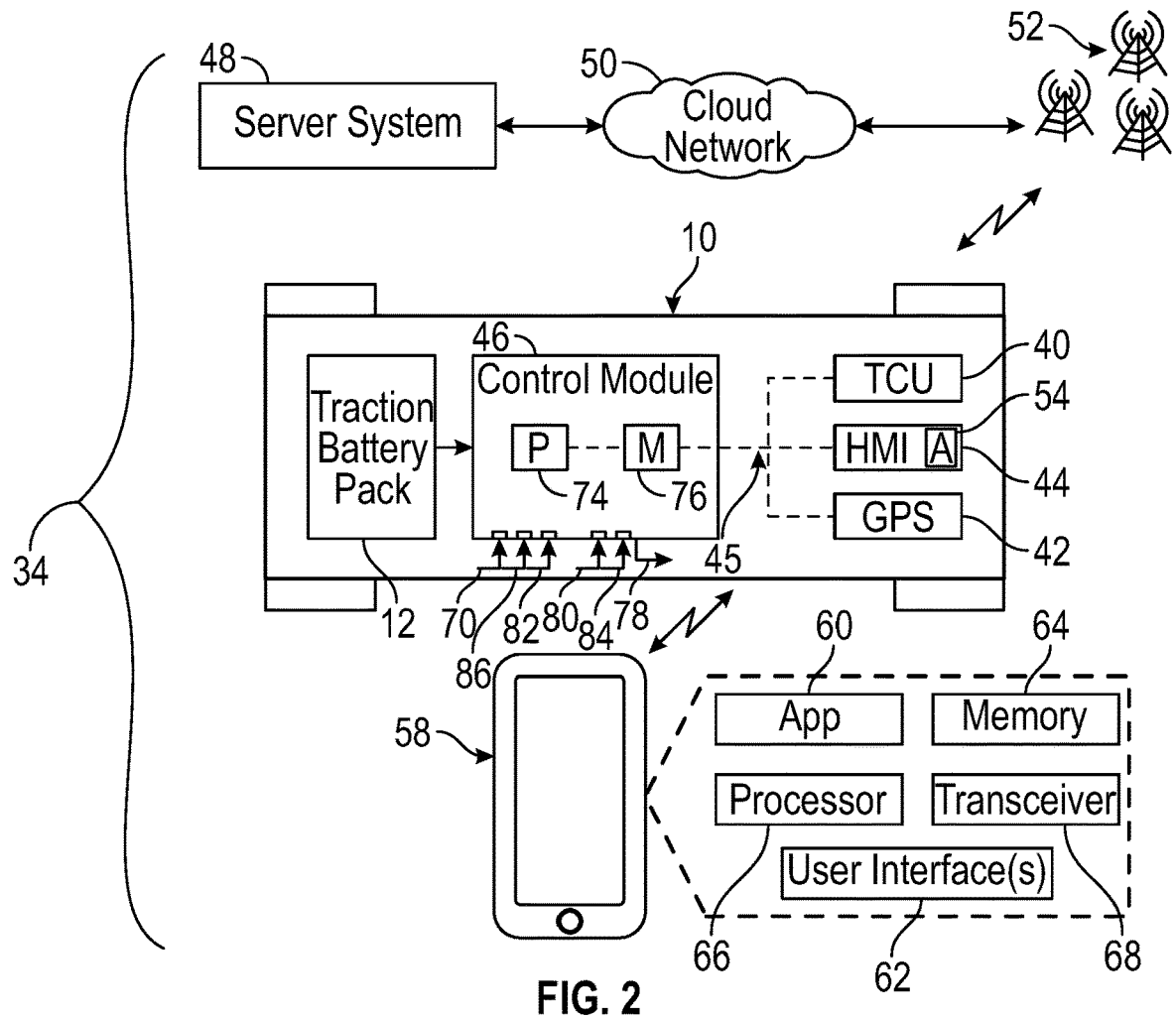
FIG. 2 schematically illustrates a charging guidance system of the electrified vehicle of FIG. 1.

FIG. 2 is a highly schematic depiction of a charging guidance system 34 of the electrified vehicle 10. The charging guidance system 34 may be configured to influence the charging decisions of a user/owner of the electrified vehicle 10, such as by coaching or influencing the user to select a less aggressive charging option (e.g., Level 2 charging) over a more aggressive charging option (e.g., DC fast charging) when certain conditions are met.

As part of the charging guidance system 34, the electrified vehicle 10 may include a telecommunications module 40, a global positioning system (GPS) 42, a human machine interface (HMI) 44, and a control module 46. These and other components may be interconnected and in electronic communication with one another over a communication bus 45 of the electrified vehicle 10. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48. The server system 48 may include various servers that store data that may be accessed by the charging guidance system 34. The telecommunications module 40 may communicate over a cloud network 50 (e.g., the internet) to obtain various information stored on the server system 48 or to provide information to the server system 48 that can subsequently be accessed by the electrified vehicle 10 (and/or other participating components of the charging guidance system 34). The server system 48 can identify, collect, and store user data associated with the electrified vehicle 10 for validation purposes. Upon an authorized request, data may be subsequently transmitted to the telecommunications module 40 via one or more cellular towers 52 or some other known communication technique (e.g., Wi-Fi, Bluetooth®, data connectivity, wireless mesh networks, lower power long range networks, smart utility networks, etc.). Upon commands from the control module 46 of the charging guidance system 34, the telecommunications module 40 can receive data from the server system 48 or can communicate data back to the server system 48 via the cellular tower(s) 52. Although not necessarily shown or described in this highly schematic embodiment, numerous other components may enable bidirectional communications between the electrified vehicle 10 and the server system 48.

In a first embodiment, a user/owner of the electrified vehicle 10 may interface with the server system 48 using the HMI 44. For example, the HMI 44 may be equipped with an application 54 (e.g., FordPass™ or another similar web-based application) adapted for interfacing with the server system 48. The HMI 44 may be located within a passenger cabin of the electrified vehicle 10 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the electrified vehicle 10 could alternatively or additionally interface with the server system 48 for coordinating charging events using a personal electronic device 58 (e.g., a smart phone, tablet, computer, wearable smart device, etc.). The personal electronic device 58 may include an application 60 (e.g., Ford-Pass™ or another similar application) that includes programming to allow the user to employ one or more user interfaces 62 for entering user inputs for setting or controlling certain aspects of the charging guidance system 34. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the electrified vehicle 10. The GPS 42 may utilize geopositioning techniques or any other satellite navigation techniques for estimating the geographic position of the electrified vehicle 10 at any point in time. The GPS 42 may additionally store and/or track driving habit information of the user/owner who is associated with the electrified vehicle 10. The driving habit information may include historical drive routes used by the user, planned drive routes, frequently visited locations and expected arrival/departures times at each frequently visited location, home location and expected times parked at home location, etc. The driving habit information may alternatively or additionally be stored on the server system 48 and may be accessed via the applications 54, 60.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operations of various components of the charging guidance system 34. Although shown as separate modules within the highly schematic depiction of FIG. 2, the telecommunications module 40, the GPS 42, the HMI 44, and the control module 46 could be integrated together as part of common module of the electrified vehicle 10.

The control module 46 may include a processor 74 and non-transitory memory 76 for executing various control strategies and modes associated with the charging guidance system 34. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on various inputs received from other devices, such as inputs from the server system 48, the telecommunications module 40, the GPS 42, the HMI 44, the personal electronic device 58, the traction battery pack 12, etc. In an embodiment, the application 54 (e.g., FordPass™ or another similar application), which includes programming for allowing the vehicle user to employ one or more user interfaces within the HMI 44 for setting or controlling certain aspects of the charging guidance system 34, may be stored in the memory 76 and may be executed by the processor 74 of the control module 46. Alternatively, the control module 46 may be configured to communicate and interface with the personal electronic device 58 for coordinating and/or executing certain aspects of the charging guidance system 34 through the application 60.

The control module 46 may receive and process various inputs for coaching/influencing the charging decisions of a user/owner of the electrified vehicle 10. The coaching/ influencing may be provided by executing a charging guidance feature 78 of the charging guidance system 34. The charging guidance feature 78 may be presented to the user of the electrified vehicle 10 in the form of a series of charging-related prompts. The charging-related prompts may be presented to the user at the HMI 44 and/or the personal electronic device 58, for example. The charging-related prompts associated with the charging guidance features 78 are designed to guide the user for making logical decisions related to the optimal charging methodology to use for any given non-routine travel route situation. For example, when the various inputs so dictate, the charging-related prompts of the charging guidance feature 78 may influence or "coach" the user to select a less aggressive charging option (e.g., Level 2 charging) over a more aggressive charging option (e.g., DC fast charging), thereby improving the performance and asset utilization of the traction battery pack 12.

Figure 3:
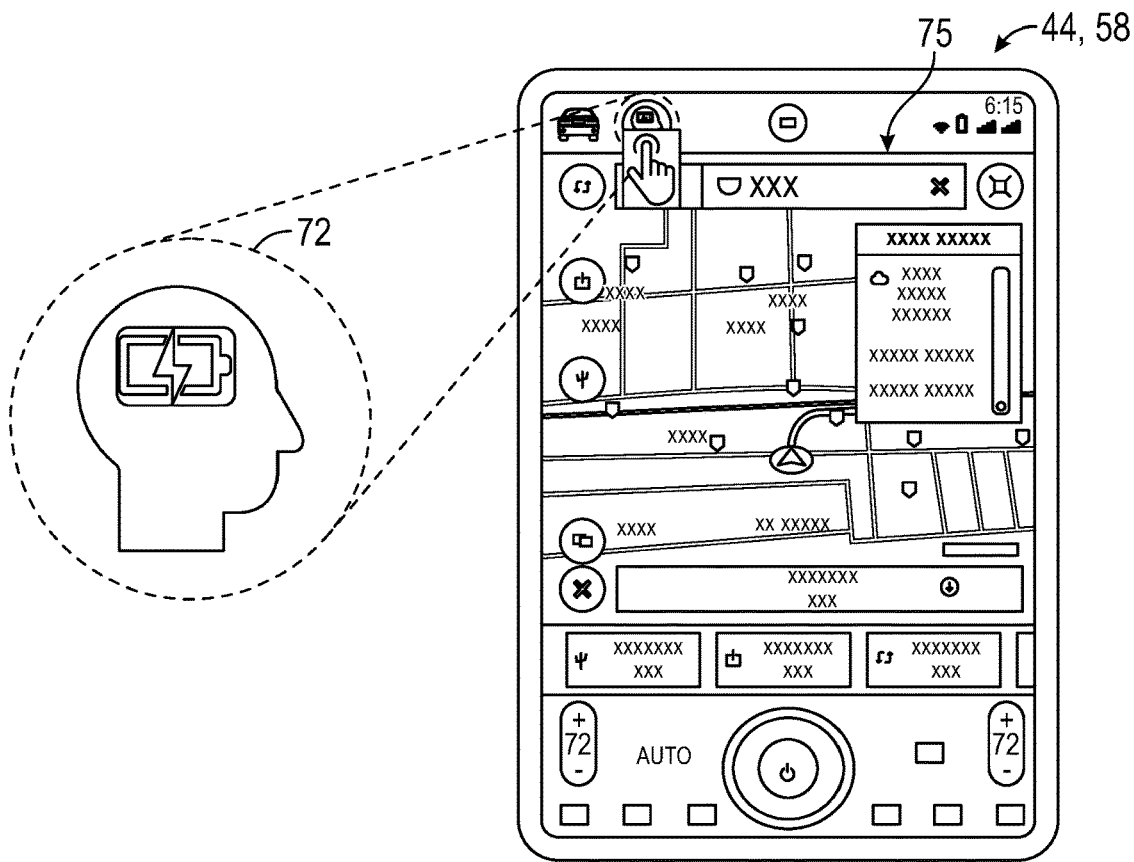
FIG. 3 illustrates an exemplary user interface of a human machine interface (HMI) associated with the charging guidance system of FIG. 2.

A first input to the control module 46 may include a first user input 70 received from the user of the electrified vehicle 10. The first user input 70 may indicate that the user has initiated the charging guidance feature 78 of the charging guidance system 34. In an embodiment, first user input 70 may be received by the control module 46 when the user taps or otherwise actuates a charge planner icon 72 of a user interface 75 (see, for example, FIG. 3) of the HMI 44 or the personal electronic device 58.

Another input to the control module 46 may include vehicle location information 80. The vehicle location information 80 may be received from the GPS 42, in an embodiment.

Another input to the control module 46 may include charging station information 82. The charging station information 82 may include known charging stations located within a threshold distance of the vehicle location. The charging station information 82 may additionally include available charging options at each of the identified charging locations, charging power limits at each location, etc. The charging station information 82 may be received from the GPS 42 or from the server system 48, for example.

Another input to the control module 46 may include vehicle prognostic information 84 received from various components/subsystems of the electrified vehicle 10. The vehicle prognostic information 84 may include information such as current state of charge (SOC) of the traction battery pack 12, estimated travel range of the electrified vehicle 10, the current charging power limit of the traction battery pack 12, etc.

Yet another input to the control module 46 may include one or more additional user inputs 86 from the user of the electrified vehicle 10. The additional user inputs 86 may be received by the HMI 44 or the personal electronic device 58. In an embodiment, the additional user inputs 86 may be received by the control module 46 when the user selects a particular charging station of interest, identifies the distance the user wishes to drive after charging, approves estimated range gains provided by Level 2 charging, etc.

In an embodiment, based at least on the vehicle location information 80, the control module 46 may be programmed to generate a list of nearby charging station locations. The list may include an identification of whether or not each charging location has multiple charging options. The list of charging station locations and charging option information may be presented to the user on the HMI 44 and/or the personal electronic device 58 as part of the prompts associated with the charging guidance feature 78.

Figure 4:
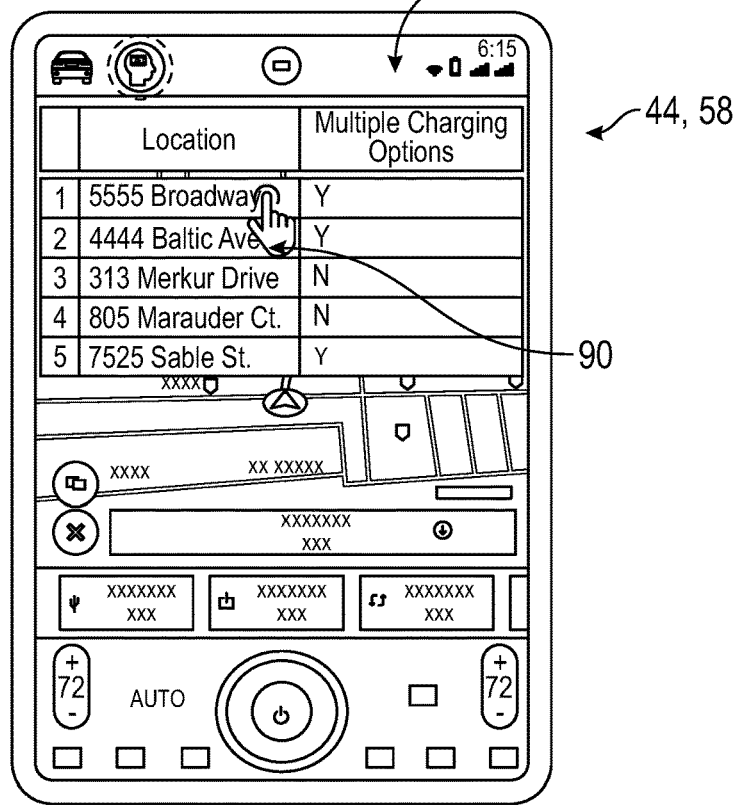
FIG. 4 illustrates another exemplary user interface of the HMI of the charging guidance system of FIG. 2.

An exemplary user interface 88 that can be presented to the user on the HMI 44 or the personal electronic device 58 for presenting the charging station information is schematically illustrated in FIG. 4. The user interface 88 may include toggles 90 for allowing the user to select the desired charging station. Although shown as toggles, the user interface 88 could employ buttons, drop down menus, or any other features or combinations of features that would allow the user to select the desired charging station location from the compiled charging station listing. The user's selection could also be made audibly within the scope of this disclosure.

In another embodiment, based at least on the charging station information 82, the vehicle prognostic information 84, and the one or more additional user inputs 86, the control module 46 may be programmed to calculate whether or not the distance (e.g., in miles or kilometers) to drive after charging is less than an estimated travel range of the electrified vehicle 10 prior to charging.

The control module 46 may be further programmed to determine the amount of range gained over time for Level 2 charging when the distance to drive after charging is greater than the estimated travel range of the electrified vehicle prior to charging. The time versus range gained information may be presented to the user on the HMI 44 and/or the personal electronic device 58 as part of the prompts associated with the charging guidance feature 78. The range gained over time may be calculated based at least on the vehicle prognostic information 84 (e.g., including the current state of charge (SOC) and current charging power limit of the traction battery pack 12) and the charging station information 82 (e.g., including the charging station power limits) and may be derived using one or more lookup tables stored in the memory 76 of the control module 46, for example.

Figure 5:
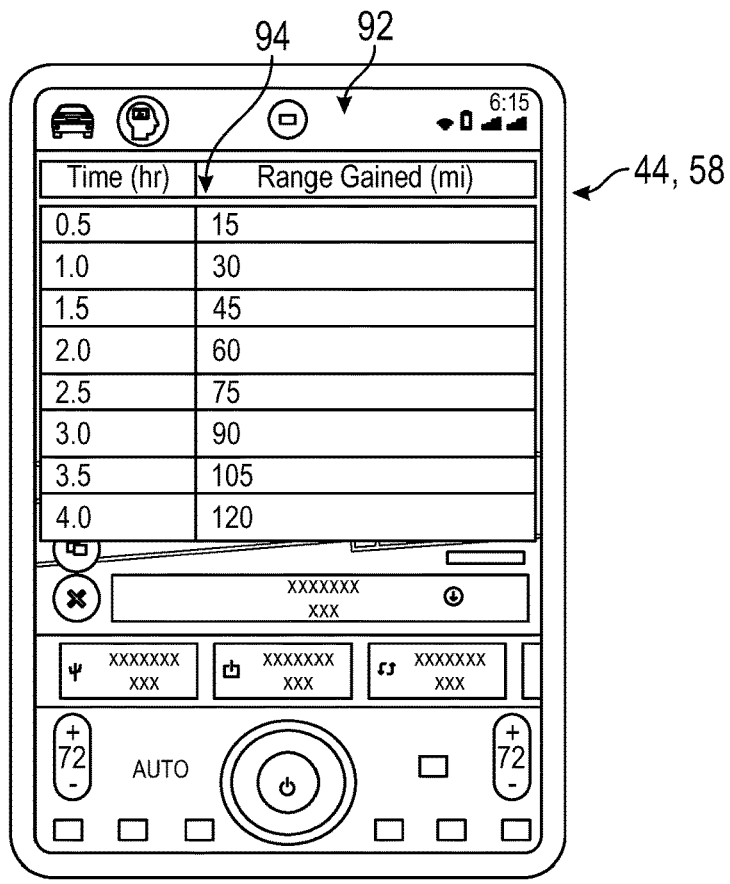
FIG. 5 illustrates yet another exemplary user interface of the HMI of the charging guidance system of FIG. 2.

An exemplary user interface 92 that can be presented to the user on the HMI 44 or the personal electronic device 58 for presenting a table 94 of the time versus range gained information is schematically illustrated in FIG. 5. The time versus range gained table 94 may indicate the amount of travel range that can be gained by Level 2 charging for each of a plurality of predefined time periods (e.g., 0.5 hours, 1 hour, 1.5 hours, 2 hours, 4 hours, etc.). The user can confirm whether the range gains indicated within the table 94 for Level 2 charging fit his/her travel plans by actuating on or more tactile buttons of the user interface 92. The user may also indicate his/her approval audibly within the scope of this disclosure.

Figure 6:
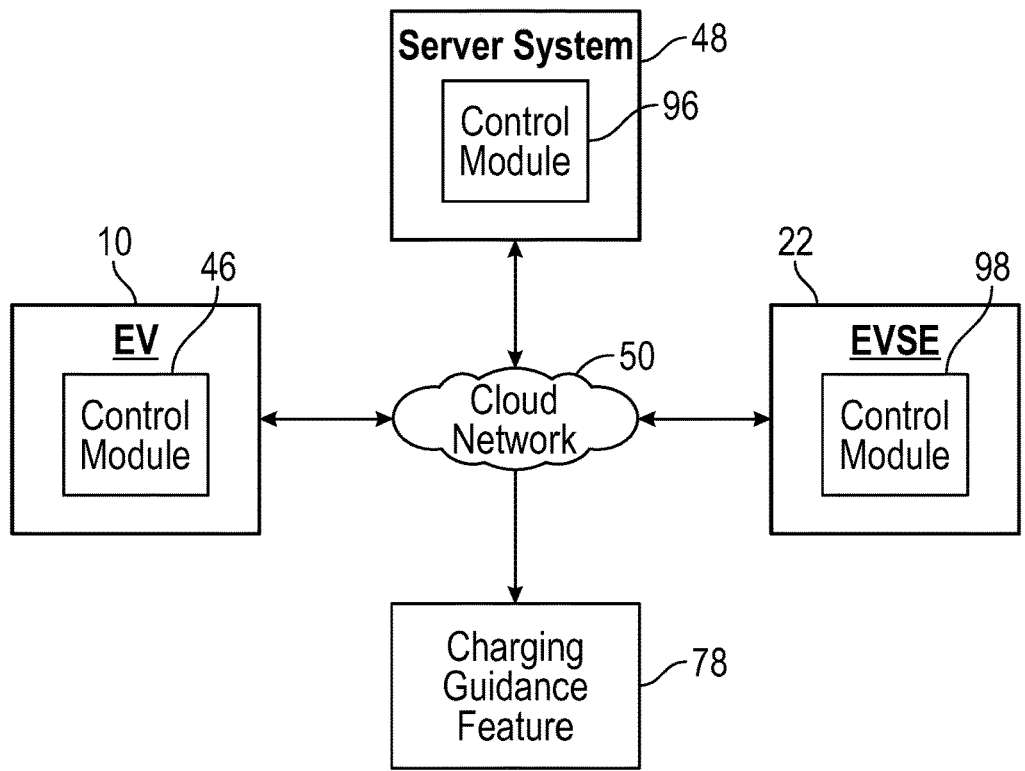
FIG. 6 schematically illustrates a control system of a charging guidance system.

In the embodiments described above, the control module 46 of the electrified vehicle 10 may be configured to function as the communications hub of the charging guidance system 34. However, other embodiments are also contemplated within the scope of this disclosure. For example, as shown in FIG. 6, a control module 96 of the server system 48 (e.g., a cloud-based control module) and/or a control module 98 associated with the EVSE system 22 could be configured to function as the communications hub of the charging guidance system 34. In yet another embodiment, the respective control modules of each of the electrified vehicle 10, the EVSE system 22, and the server system 48 may operate together over the cloud network 50 to establish a control system for controlling the functionality of the charging guidance system 34, such as for coordinating and executing the charging guidance feature 78, for example.

Figure 7:
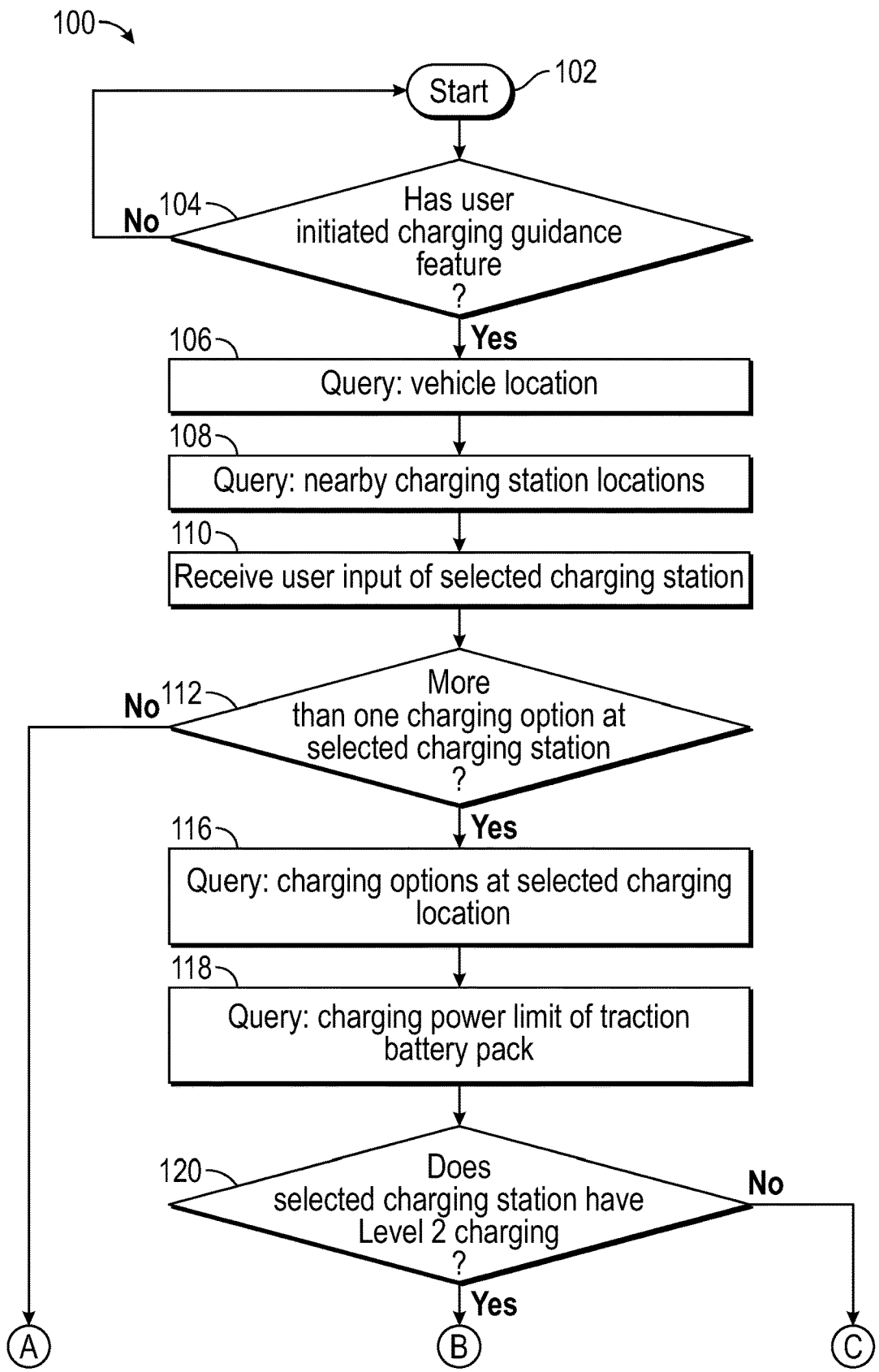
FIG. 7 schematically illustrates a method of influencing a charging decision of a user of an electrified vehicle.
Figure 7:
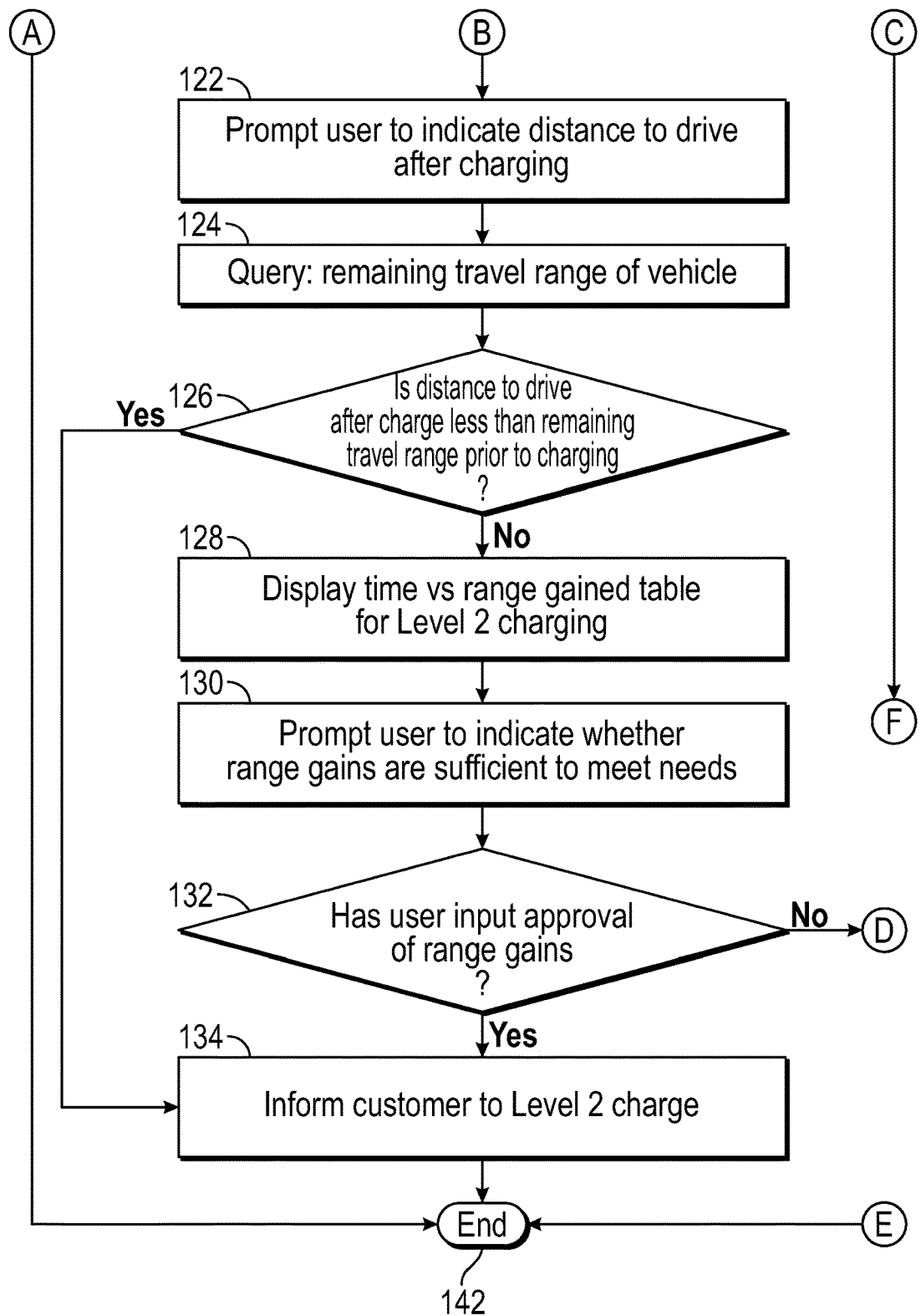
Figure 7:
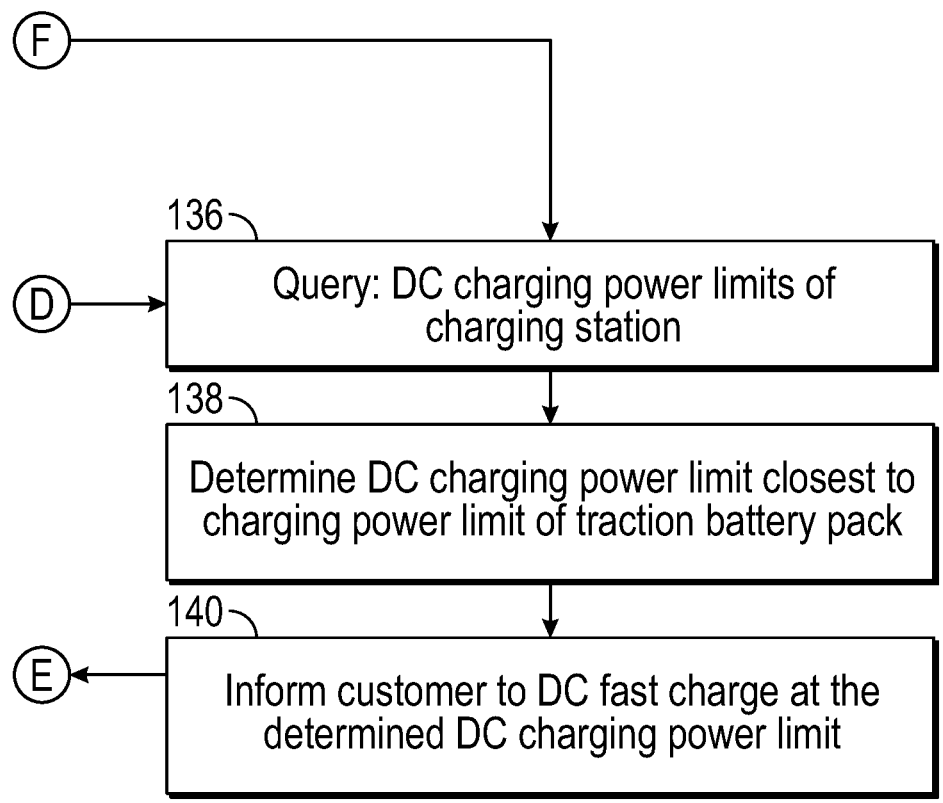

FIG. 7, with continued reference to FIGS. 1-6, schematically illustrate in flow chart form an exemplary method 100 for influencing the charging decisions of a user of the electrified vehicle 10. The charging guidance system 34 may be configured to employ one or more algorithms adapted to execute at least a portion of the steps of the exemplary method 100. For example, the method 100 may be stored as executable instructions in the memory 76 of the control module 46, and the executable instructions may be embodied within any computer readable medium that can be executed by the processor 74 of the control module 46. The method 100 could alternatively or additionally be stored as executable instructions in the respective memories of the control module 96 of the server system 48 and/or the control module 98 of the EVSE system 22.

The exemplary method 100 may begin at block 102. At block 104, the method 100 may determine whether the user of the electrified vehicle 10 has initiated the charging guidance feature 78 of the charging guidance system 34. The charging guidance feature 78 may be initiated by tapping the charge planner icon 72 of the user interface 75 (see FIG. 3) of the HMI 44 or the personal electronic device 58, for example.

If the charging guidance feature 78 has been initiated, the method 100 may proceed to block 106 by querying the GPS 42 for the current location of the electrified vehicle 10. The method 100 may further query the server system 48 for nearby charging station locations at block 108.

Next, at block 110, the method 100 may receive a user input of a selected charging station. The method 100 may then determine whether the selected charging station is equipped to provide more than one charging option (e.g., Level 2 charging and DC fast charging) at block 112. If NO, the method 100 may end at block 142. If YES, the method 100 may continue to block 116.

At block 116, the method 100 may query the server system 48 to identify the charging options available at the selected charging station. The method 100 may further query the traction battery pack 12 for determining the current charging power limit of the traction battery pack 12 at block 118.

At block 120, the method 100 may determine whether the selected charging station is equipped to provide Level 2 charging. If YES, the method 100 may prompt the user to indicate the distance they desire to drive after charging the electrified vehicle 10 at block 122. The method 100 may then query the remaining travel range of the electrified vehicle 10 at block 124.

The method 100 may next determine whether the distance to drive after charging is less than the remaining travel range of the electrified vehicle 10 at block 126. If NO, the method 100 may display the time versus range gained table 94 to the user within the user interface 92 at block 128.

The method 100 may next prompt the user to indicate whether the range gains indicated by the table 94 are sufficient to meet the user's travel needs at block 130. The method 100 may then determine whether the user has approved of the Level 2 charging range gains at block 132. If YES, the method 100 may instruct the user to Level 2 charge the electrified vehicle 10 at block 134. The instruction to Level 2 charge may be made via a text-based command or a voice command, for example.

If the selected charging station is not equipped to provide Level 2 charging (at block 120), or if the user does not approve of the range gains offered by Level 2 charging (at block 132), the method 100 may proceed to block 136. At this step, the method 100 may query the server system 48 for the DC charging power limits of the selected charging station. The DC charging power limit that is closest to the charging power limit of the traction battery pack 12 may be determined at block 138. The method 100 may then inform the user to DC fast charge at the determined DC charging power limit at block 140. The instruction to DC fast charge may be made via a text-based command or a voice command, for example.

The method 100 may end at block 142. The method 100 may proceed directly to block 142 from block 112, block 134, or block 140.

The charging guidance systems of this disclosure are configured to provide guidance to electrified vehicle users in a manner that influences the user's charging decisions. For example, the users may be "coached" to charge their traction battery pack at a lower level charging option as opposed to a higher level charging option. Charging at lower level charging options when certain conditions are met may improve battery performance, reduce costs, and preserve the life/warranty and asset utilization of the traction battery pack over the entire usage life of electrified vehicles.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
    a traction battery pack;
    a charging guidance system configured to influence a decision for charging the traction battery pack at a lower level charging option as opposed to a higher level charging option in response to a user input that indicates that a user of the electrified vehicle has initiated a charging guidance feature of the charging guidance system; and
    a human machine interface (HMI) configured to allow a user to enter the user input,
    wherein the user input is initiated when the user actuates a charge planner icon on a user interface of the HMI.

2. The electrified vehicle as recited in claim 1, wherein the lower level charging option includes Level 2 charging and the higher level charging option includes DC fast charging.

3. The electrified vehicle as recited in claim 1, wherein the charging guidance system includes a control module programmed to execute the charging guidance feature of the charging guidance system.

4. The electrified vehicle as recited in claim 3, wherein the charging guidance feature includes a series of charging-related prompts that are presentable to the user of the electrified vehicle and adapted to influence the decision for charging the traction battery pack.

5. The electrified vehicle as recited in claim 4, wherein the charging-related prompts include a time versus range gained table for the lower level charging option.

6. The electrified vehicle as recited in claim 5, wherein the control module is further programmed to command that the time versus range gained table be displayed on another user interface of the human machine interface or a personal electronic device associated with the electrified vehicle.

7. The electrified vehicle as recited in claim 3, wherein the control module is a component of the electrified vehicle.

8. The electrified vehicle as recited in claim 3, wherein the control module is further programmed to generate a list of nearby charging station locations as part of the charging guidance feature.

9. The electrified vehicle as recited in claim 3, wherein the control module is further programmed to calculate whether or not a distance to drive after charging is less than an estimated remaining travel range of the electrified vehicle prior to charging as part of the charging guidance feature.

10. The electrified vehicle as recited in claim 9, wherein the control module is further programmed to determine an amount of range gained over time for the lower level charging option when the distance to drive after charging is greater than the estimated remaining travel range of the electrified vehicle prior to charging and further programmed to inform the user to charge at the lower level charging option when the distance to drive after charging is less than the estimated remaining travel range of the electrified vehicle prior to charging.

11. The electrified vehicle as recited in claim 1, wherein the HMI is located within a passenger cabin of the electrified vehicle.

12. The electrified vehicle as recited in claim 1, wherein a control module of the charging guidance system is programmed to prompt the user to charge at the lower level charging option when a distance to drive after charging is less than an estimated remaining travel range of the electrified vehicle prior to charging.

13. A method, comprising:
receiving, at a control module of a charging guidance system of an electrified vehicle, a user input indicating that a charging guidance feature has been initiated,
wherein the user input is received for initiating the charging guidance feature when a user of the electrified vehicle actuates a charge planner icon on a user interface of a human machine interface (HMI) or a personal electronic device associated with the electrified vehicle; and
presenting the user of the electrified vehicle with a series of charging-related prompts in response to receiving the user input,
wherein the charging-related prompts are configured to influence a decision for charging a traction battery pack of the electrified vehicle at a lower level charging option as opposed to a higher level charging option.

14. The method as recited in claim 13, wherein the lower level charging option includes Level 2 charging and the higher level charging option includes DC fast charging.

15. The method as recited in claim 13, wherein presenting the user with the series of charging-related prompts includes prompting the user to select a nearby charging station.

16. The method as recited in claim 13, wherein presenting the user with the series of charging-related prompts includes prompting the user to indicate a distance to travel after charging.

17. The method as recited in claim 13, wherein presenting the user with the series of charging-related prompts includes displaying a time versus range gained table for the lower level charging option.

18. The method as recited in claim 17, wherein presenting the user with the series of charging-related prompts includes prompting the user to indicate whether the range gained indicated by the time versus range gained table is sufficient to meet a travel need of the user.

19. The method as recited in claim 18, wherein presenting the user with the series of charging-related prompts includes informing the user to charge via the lower level charging option when the user indicates that range gained is sufficient to meet the travel need of the user.

20. An electrified vehicle, comprising:
a traction battery pack; and
a charging guidance system configured to influence a decision for charging the traction battery pack at a lower level charging option as opposed to a higher level charging option in response to a user input received from a user of the electrified vehicle,
wherein the charging guidance system includes a control module programmed to execute a charging guidance feature of the charging guidance system,
wherein the control module is further programmed to calculate whether a distance to drive after charging is less than an estimated remaining travel range of the electrified vehicle prior to charging as part of the charging guidance feature,
wherein the control module is further programmed to inform the user to charge at the lower level charging option when the distance to drive after charging is less than the estimated remaining travel range of the electrified vehicle prior to charging.

\* \* \* \* \*